United States Patent

Sasaki et al.

[11] Patent Number: 5,177,421
[45] Date of Patent: Jan. 5, 1993

[54] METHOD OF CORRECTING MACHINE POSITION CHANGE

[75] Inventors: Takao Sasaki, Hachioji; Kentaro Fujibayashi, Musashino; Makoto Haga, Tokyo, all of Japan

[73] Assignee: Fanuc Ltd., Minamitsuru, Japan

[21] Appl. No.: 720,765

[22] PCT Filed: Nov. 2, 1990

[86] PCT No.: PCT/JP90/01431
§ 371 Date: Jul. 2, 1991
§ 102(e) Date: Jul. 2, 1991

[87] PCT Pub. No.: WO91/07705
PCT Pub. Date: May 30, 1991

[30] Foreign Application Priority Data

Nov. 16, 1989 [JP] Japan .................................. 1-298568

[51] Int. Cl.$^5$ ............................................. G05B 19/25
[52] U.S. Cl. ..................................... 318/571; 318/632; 364/474.28; 364/474.35
[58] Field of Search ............... 318/560, 561, 563, 567, 318/569–570, 599, 600–602, 572, 571, 632; 364/474.11, 474.16, 474.17, 474.15, 474.28, 474.29, 474.35

[56] References Cited

U.S. PATENT DOCUMENTS

| 4,502,108 | 2/1985 | Nozawa et al. | 318/632 X |
| 4,514,813 | 4/1985 | Nozawa et al. | 318/570 X |
| 4,659,265 | 4/1987 | Kishi et al. | 318/572 |

Primary Examiner—William M. Shoop, Jr.
Assistant Examiner—David Martin
Attorney, Agent, or Firm—Staas & Halsey

[57] ABSTRACT

A method of correcting a change of position of a machine tool having at least two control axes avoids abrupt machining errors. A position correction means (12) outputs correction pulses (Xcp, Ycp) so that the ratio of actual amounts of movement of the respective axes, obtained from the output values of position detectors (8X, 8Y) detecting a position of the machine tool, becomes equal to the ratio (R1) of distribution pulses (Xp1, Yp1) for the respective axes. The correction pulses (Xcp, Ycp) are added to the distribution pulses (Xp1, Yp1). Accordingly, an abrupt machining error caused at the beginning or just before the end of machining, or when machining a corner of a workpiece, is alleviated.

2 Claims, 4 Drawing Sheets

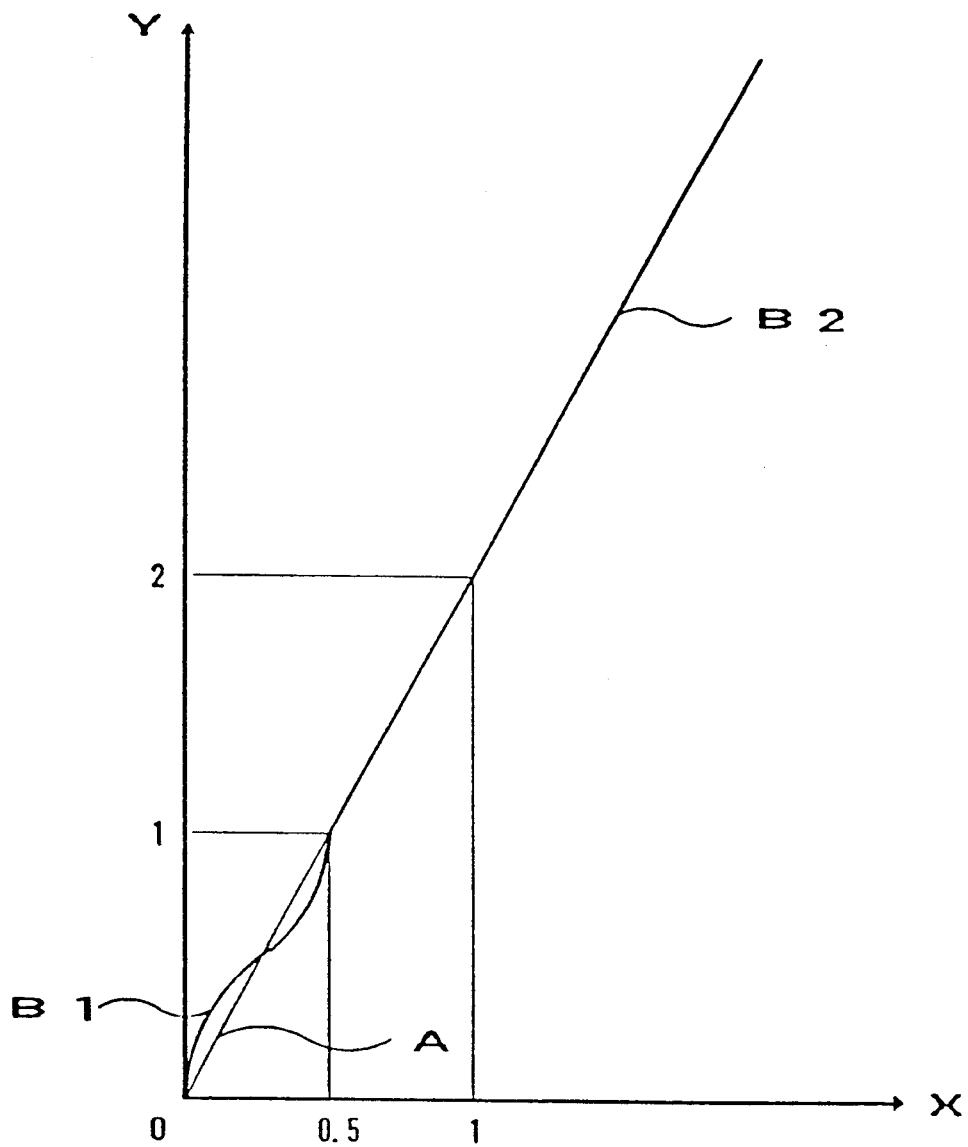
F I G. 3

METHOD OF CORRECTING MACHINE POSITION CHANGE

BACKGROUND OF THE INVENTION

1. Field of the Invention

The present invention relates to a method of correcting a change of position of a machine tool controlled by a numerical control device, and more particularly, to a position correction method in which a change of position of a machine tool with control axes having different rigidities is corrected.

2. Description of the Related Art

In a numerical control device (CNC), a workpiece is machined to a desired contour by moving a tool along a commanded path at a commanded speed in accordance with a machining program.

To obtain a satisfactorily machined surface produced in accordance with commands given to a machine tool, using such a numerical control device, it is essential to provide a servo mechanism having a responsiveness such that it can faithfully follow rapid changes of commands and having a high stability enabling the maintaining of a stable movement without vibration.

The speed and position of a servomotor in the servo mechanism are detected by a speed detector and a position detector, and the data thus detected is fed back to a control circuit for control. The servo mechanism can be classified into three types according to the method used for the position detection; i.e., a semi-closed-loop type, a closed-loop type, and a hybrid servo type.

Among these three methods used for the servo mechanism, a method best suited to each machine tool is employed according to a required accuracy and rigidity, etc. of the machine tool.

In ordinary machine tools, however, the individual axes have different mechanical rigidities, and this difference becomes particularly large in large-sized machine tools. Therefore, when a cutting is effected by a machine tool with more than two axes, machining errors occur in the vicinity of the machining start and end points or at corners, and thus the cutting cannot be effected with a high accuracy.

FIG. 4 shows a cutting with two axes according to the prior art. In this example, it is assumed that the X-axis has a relatively weak mechanical rigidity and the Y-axis has a relatively strong mechanical rigidity, and with these control axes, when there is movement along the X-axis 0.100 mm, of the movement along Y-axis is 0.200 mm.

If the mechanical rigidities of the X- and Y-axes are the same, a linear cutting with no error is usually effected as indicated by the straight line A, but if mechanical rigidity of the X-axis is weak, a required movement along the X-axis is not achieved, as indicated by the curve B1, and even though the ratio between the distribution pulses for the X-axis and Y-axis is 1:2, an actual ratio of machine position becomes 1:4, as shown at the point C, thus causing a machining error.

SUMMARY OF THE INVENTION

The present invention has been made in view of the aforesaid drawbacks, and an object thereof is to provide a method of correcting a machine position change in which an abrupt machining error caused by a difference of the mechanical rigidities of machine parts in the direction of control axes can be suppressed.

To achieve the above object, the present invention provides a method of correcting a change of position of a machine tool having at least two control axes, characterized in that a correction pulse is added to a distribution pulse for individual axes, such that the ratio of actual amounts of movement of the respective axes of the machine tool, obtained from output values of a position detector for detecting a position of the machine tool, becomes equal to the ratio of the distribution pulses for the respective axes.

The actual amounts of movement along the respective axes are obtained from the output values of the position detector for detecting the position of the machine tool, and based on these movement amounts, values by which the movement has not been achieved by the distribution pulses are derived. Therefore, when the mechanical rigidities of all of the axes are the same, the ratio of the distribution pulses for the respective axes is usually equal to the ratio of the amounts of movement of the machine tool. Nevertheless, if an error occurs due to a difference in mechanical rigidities, the ratio of the movement amounts does not coincide with the ratio of the distribution pulses for the respective axes. Therefore, a correction pulse is added to the distribution pulses for the respective axes so that the ratio of actual movement amounts of the respective axes of the machine tool becomes equal to the ratio of the distribution pulses for the respective axes, and the axes are controlled in accordance with the resulting output pulses. Accordingly, an abrupt machining error which may otherwise occur at the beginning or just before the end of machining, or when machining a corner of a workpiece, can be suppressed.

BRIEF DESCRIPTION OF THE DRAWINGS

FIG. 3 is a diagram showing a state of a cutting interpolation with two axes according to the present embodiment.

DESCRIPTION OF THE PREFERRED EMBODIMENT

An embodiment of the present invention will be hereinafter described with reference to the drawings.

Figure 1:
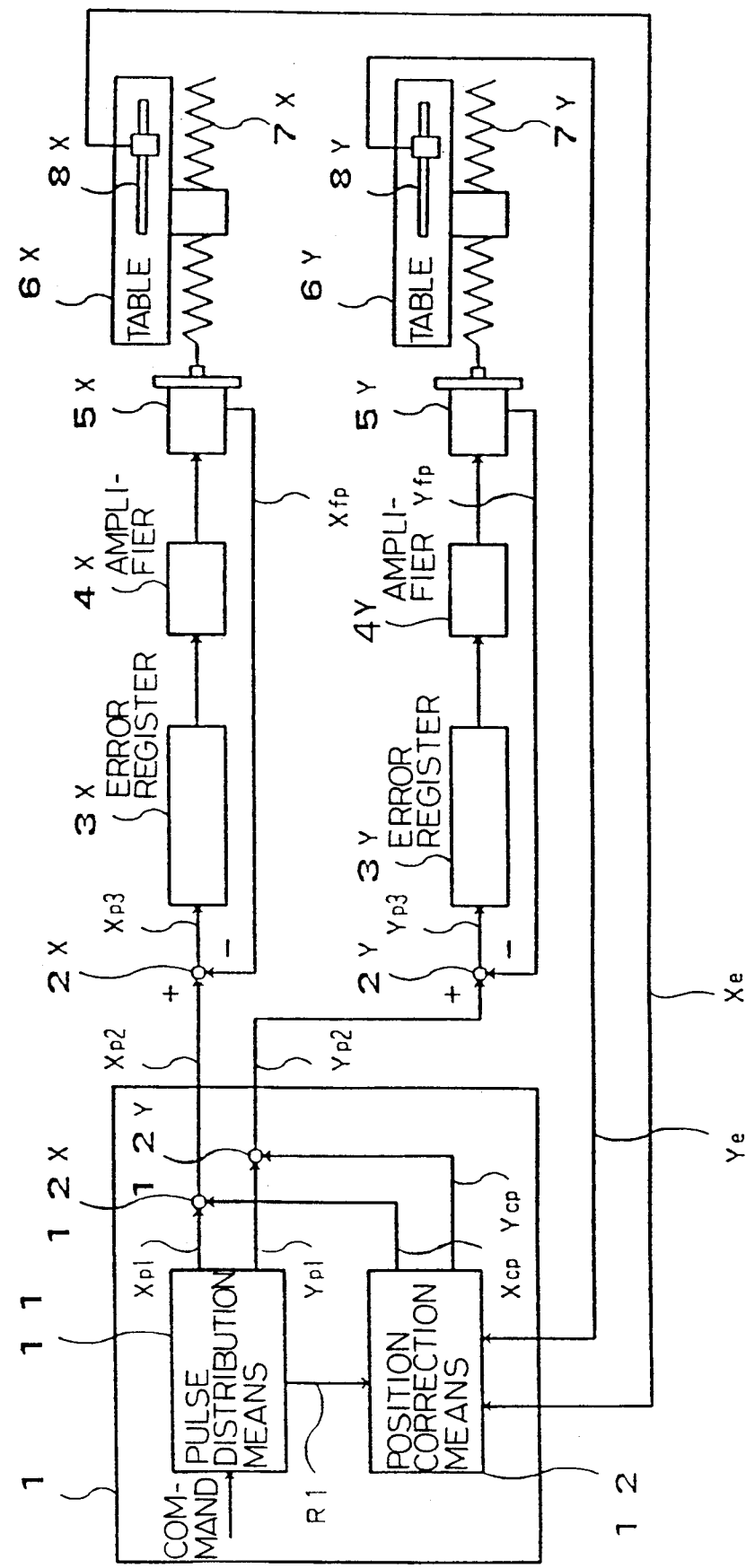
FIG. 1 is a block diagram showing a method of correcting a machine position change according to the present invention.

FIG. 1 is a block diagram showing a method of correcting a machine position change according to the present invention. A numerical control unit 1 is provided with a pulse distribution means 11 and a position correction means 12.

The pulse distribution means 11 controls servomotors 5X and 5Y. Specifically, the means 11 receives a command based on a machining program from a processor (not shown), carries out an interpolative operation after subjecting the command to an acceleration/deceleration control, and outputs command pulses Xp1 and Yp1 to operators 12X and 12Y to control the servomotors 5X and 5Y associated with the X-axis and the Y-axis, respectively. Further, the pulse distribution means 11 calculates the ratio R1 of the command pulse Xp1 to the pulse Yp1 and outputs a signal R1, representing the result, to the position correction means 12.

The position correction means 12 is supplied with position signals Xe and Ye from position detectors 8X and 8Y attached to tables 6X and 6Y of a machine tool, and the signal R1 from the pulse distribution means 11. Thereafter, the position correction means 12 calculates the ratio R2 of the position signal Xe to the signal Ye, compares the result with the ratio R1 of the command pulse Xp1 to the pulse Yp1, output from the pulse distribution means 11, and supplies a correction pulse Xcp or Ycp to the operator 12X or 12Y whereby the two ratios are made equal.

The operators 12X and 12Y output command pulses Xp2 and Yp2, which are obtained by adding the command pulses Xp1 and Yp1 to the correction pulses Xcp and Ycp from the position correction means 12, to operators 2X and 2Y.

The operators 2X and 2Y output values obtained by subtracting position feedback pulses Xfp and Yfp of the servomotors 5X and 5Y from the command pulses Xp2 and Yp2, i.e., pulses Xp3 and Yp3 corresponding to the error amounts, to the error registers 3X and 3Y.

The error registers 3X and 3Y store the numbers of the pulses Xp3 and Yp3 corresponding to the error amounts and output voltages corresponding thereto to amplifiers 4X and 4Y.

The amplifiers 4X and 4Y amplify output voltages from the error registers 3X and 3Y and drive the servomotors 5X and 5Y.

The servomotors 5X and 5Y, each including a pulse coder, feed outputs of the pulse coders back to the operators 2X and 2Y as the position feedback pulses Xfp and Yfp.

The servomotors 5X and 5Y are coupled to ball screws 7X and 7Y integral with tables, and therefore, an X-axis table 6X and a Y-axis table 6Y are moved in accordance with the operation of the servomotors 5X and 5Y. The position detectors 8X and 8Y for detecting the machine position are provided at the tables 6X and 6Y. For the position detectors 8X and 8Y, an inductosyn scale, magnetic scale, optical scale, moire fringe counter, laser measuring device, or the like is used.

In FIG. 1 the tables 6X and 6Y are shown as separate elements, but in practice they constitute one table. Also in the figure, a spindle control circuit, spindle amplifier and spindle motor for controlling a spindle and the like, are omitted.

Figure 2:
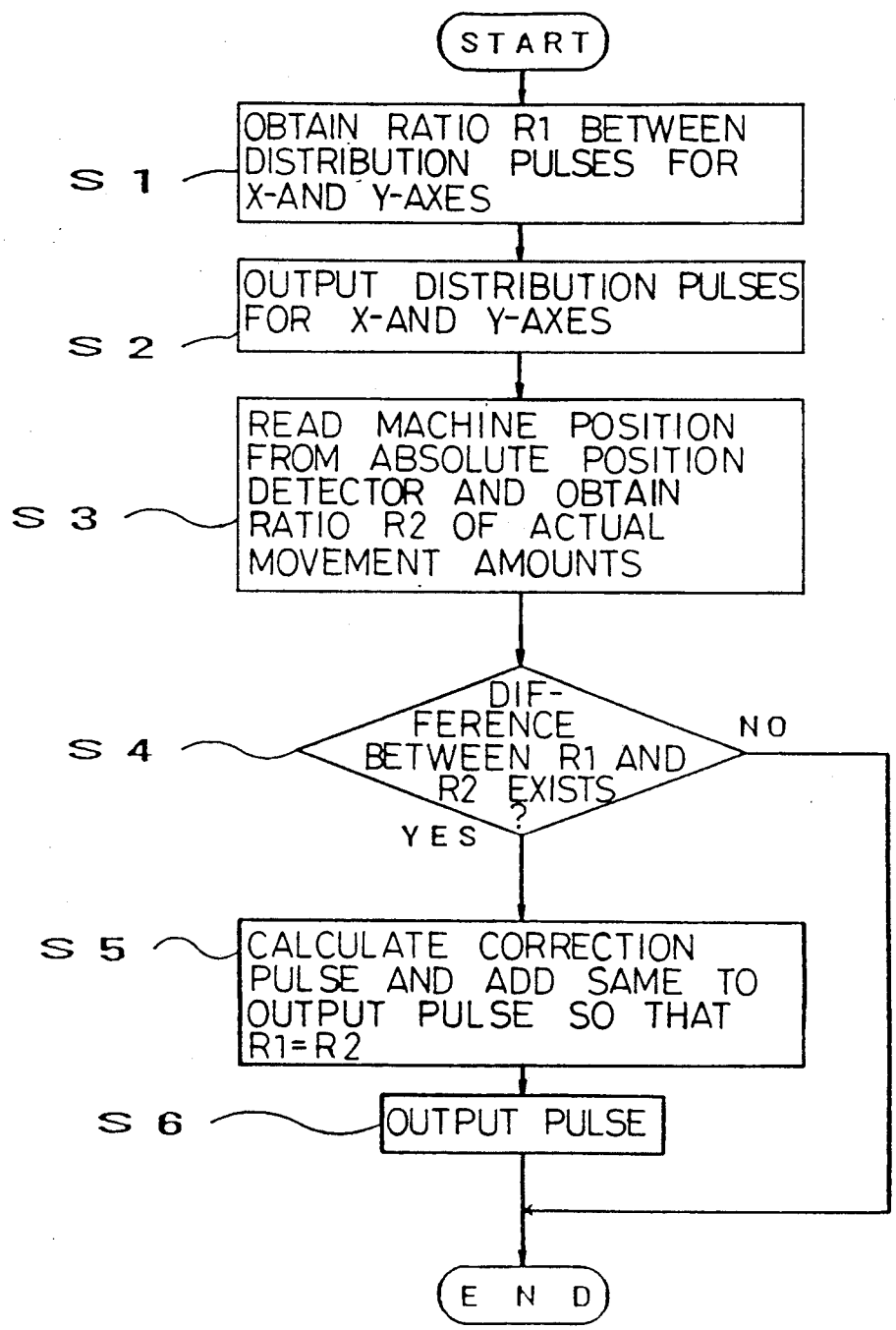
FIG. 2 is a flowchart showing a position correction method according to an embodiment of the present invention.

The operation according to the present embodiment will be explained with reference to the drawings. FIG. 2 is a flowchart showing the position correction method according to the present embodiment, and FIG. 3 is a diagram showing a state of a cutting interpolation with two axes according to the present embodiment, which corresponds to FIG. 4. In FIG. 2, numerical values following the letter S indicate the step numbers.

[S1] The pulse distribution means 11 obtains the ratio R1 of the command pulse Xp1 for the X-axis servomotor 5X to the command pulse Yp1 for the Y-axis servomotor 5Y, and outputs the obtained ratio R1 to the position correction means 12.

[S2] The pulse distribution means 11 outputs distribution pulses in accordance with the commands, i.e., the command pulses Xp1 and Yp1.

Although, in this embodiment, the ratio R1 is obtained by the pulse distribution means 11, the pulse distribution means 11 may be designed to output the command pulses Xp1 and Yp1 directly to the position correction means 12, and thus the ratio R1 may be obtained at the position correcting means 12.

[S3] The position correction means 12 receives the machine position data from each of the position detectors 8X and 8Y, and obtains the ratio R2 between the actual amounts of movement of the machine.

[S4] The position correction means 12 compares the ratio R1 with the ratio R2, and determines whether or not a difference exists between the two ratios. If a difference exists, the program proceeds to S5, and if not, the program is ended.

[S5] If it is determined that there is a difference between the ratio R1 and the ratio R2, the position correction means 12 calculates the correction pulse Xcp or Ycp so that the ratio R2 becomes equal to the ratio R1, and adds the correction pulse Xcp or Ycp to the command pulse Xp1 or Yp1.

[S6] The numerical control unit 1 outputs the command pulses Xp2 and Yp2 obtained by adding the correction pulses Xcp and Ycp to the command pulses Xp1 and Yp1, as distribution pulses.

Figure 4:
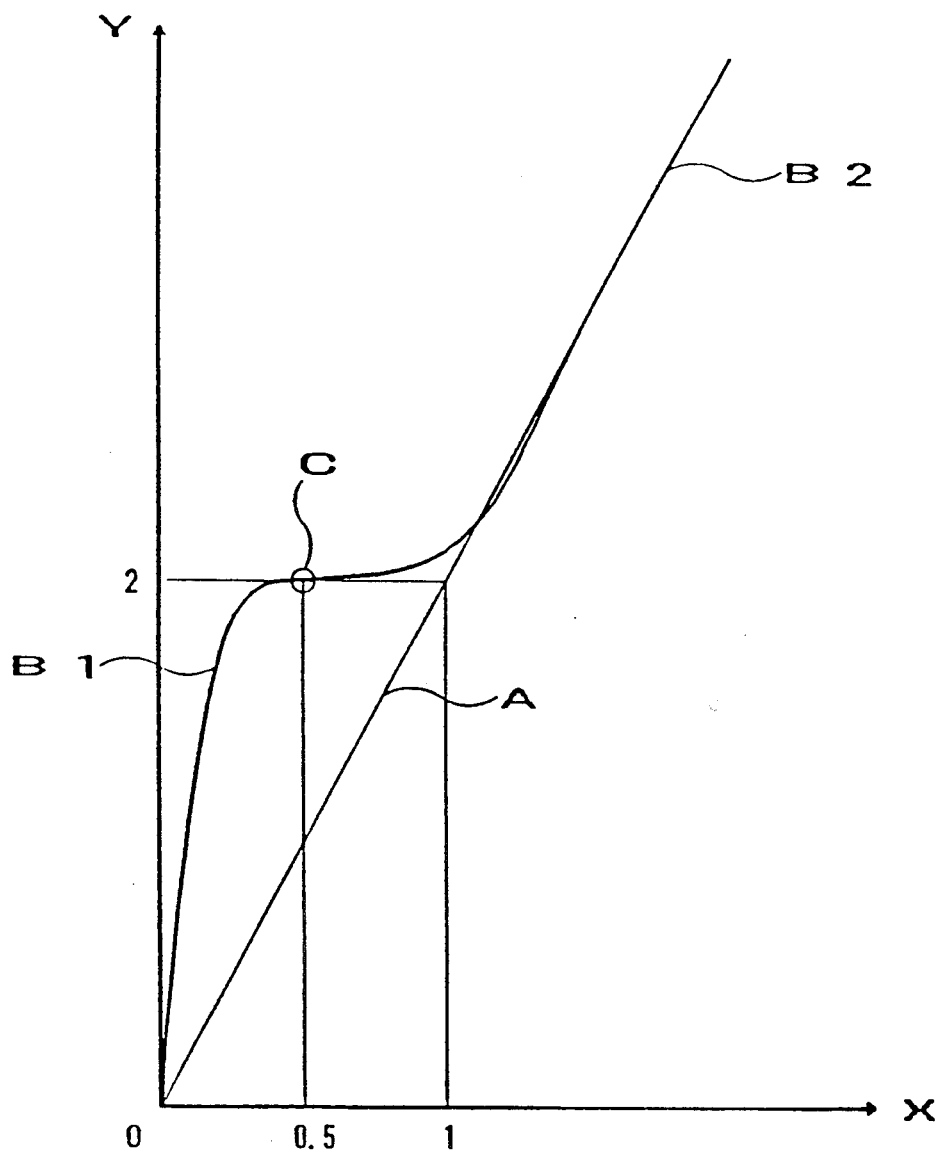
FIG. 4 is a diagram showing a state of a cutting interpolation with two axes according to prior art.

As a result of the above-described series of processes, a machining error such as that shown in FIG. 4 is suppressed as shown in FIG. 3, in which the error is minimized and the curve B1 is converted to the straight line B2, and thus a more precise linear cutting can be effected. That is, in the present embodiment, the process is repeated in such a manner that the machine position is obtained from the position detectors 8X and 8Y, actual amounts of movement of the machine are monitored, and the correction pulse Xcp or Ycp is added to the output pulse when the ratio R2 of movement amount between the X- and Y-axes becomes different from the ratio R1 (1:2), so that the ratio R2 is made equal to the ratio R1 (1:2). Accordingly, an abrupt machining error such as the one shown in FIG. 4 is inhibited and a cutting operation as shown in FIG. 3 can be carried out.

Although the above embodiment is described with reference to a two-axes control, the description similarly applies to a control using more than two axes; i.e., the ratio of actual amounts of movement of a machine is obtained from the machine position, and correction pulses are output such that the ratio becomes equal to the ratio of the distribution pulses for the respective axes.

According to the present invention, as described above, an abrupt machining error caused by a difference in the mechanical rigidities of the control axes can be alleviated.

We claim:

1. A method of correcting a change of position of a machine tool having at least two control axes, comprising:
    (a) calculating a first ratio of actual movement of the machine tool along a first control axis to actual movement along a second control axis;
    (b) calculating a second ratio of distribution pulses producing movement along the first control axis to distribution pulses producing movement along the second control axis; and
    (c) controlling movement of the machine tool by adding at least one correction pulse to the distribution pulses for one of the first and second axes to make the first ratio of actual movement along the first and second control axes equal to a third ratio of the distribution pulses plus the at least one correction pulse.

2. A method according to claim 1, wherein the at least two control axes are installed in the machine tool at locations having different rigidities.

* * * * *